US012747950B2

(12) United States Patent
Sahu et al.

(10) Patent No.: US 12,747,950 B2
(45) Date of Patent: Sep. 29, 2026

(54) LOCATION AND NAVIGATION ASSISTANT

(71) Applicant: MICROSOFT TECHNOLOGY LICENSING, LLC, Redmond, WA (US)

(72) Inventors: Tezan Sahu, Hyderabad (IN); Pravin Vithalrao Bhandakkar, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 19/059,968

(22) Filed: Feb. 21, 2025

(65) Prior Publication Data

US 2026/0251458 A1 Aug. 27, 2026

(51) Int. Cl.
*G01C 21/20* (2006.01)
*G06F 40/20* (2020.01)
*G06K 7/14* (2006.01)

(52) U.S. Cl.
CPC ........... *G01C 21/206* (2013.01); *G06F 40/20* (2020.01); *G06K 7/1417* (2013.01)

(58) Field of Classification Search
CPC ....... G01C 21/206; G01C 21/00; G06F 40/20; G06F 16/00; G06K 7/1417; G06V 10/00; G06V 20/00; G06V 20/50; G06N 3/00
(Continued)

(56) References Cited

U.S. PATENT DOCUMENTS 8,893,047 B2 * 11/2014 Cannon ................. G06T 19/006 715/848
2006/0004512 A1 * 1/2006 Herbst ............... G06Q 30/0241 701/431

(Continued)

FOREIGN PATENT DOCUMENTS

EP 3168571 A1 * 5/2017 ............. H04N 23/57
EP 3851797 A1 * 7/2021 ............. G06V 20/20

(Continued)

*Primary Examiner* — Tuan C To

(74) *Attorney, Agent, or Firm* — Newport IP, LLC; Jacob P. Rohwer

(57) ABSTRACT

The techniques presented herein are directed to a system for automated navigation assistance in indoor environments. In general, navigating an unfamiliar indoor environment can be a daunting task. This is especially true for large environments such as corporate offices, university campuses, shopping centers, and hospitals. Accordingly, the present system utilizes a reference database containing information associated with the indoor environment such as images depicting various locations, annotations describing the images, and floorplans illustrating the layout of the indoor environment. The reference database is deployed in conjunction with a multimodal language model that utilizes the collected knowledge of the reference database to provide location identification and intuitive navigation instructions. Often referred to as retrieval-augmented generation (RAG), the reference database enables the multimodal language model to respond to user requests using domain-specific information and ensure accurate outputs that are relevant to an end user's context (e.g., the indoor environment).

20 Claims, 9 Drawing Sheets

(58) Field of Classification Search
USPC .......................................................... 701/433
See application file for complete search history.

(56) References Cited

U.S. PATENT DOCUMENTS

| | | | | |
|---|---|---|---|---|
| 2018/0066944 | A1* | 3/2018 | Shu | G01C 22/006 |
| 2019/0195635 | A1* | 6/2019 | Shu | G01C 21/14 |
| 2022/0364878 | A1* | 11/2022 | DeLuca | G01C 21/206 |

FOREIGN PATENT DOCUMENTS

| | | | | |
|---|---|---|---|---|
| JP | 2016164518 | A | 9/2016 | |
| WO | 2020165650 | A2 | 8/2020 | |
| WO | WO-2021216345 | A1 * | 10/2021 | G01C 21/206 |

* cited by examiner

LOCATION AND NAVIGATION ASSISTANT

BACKGROUND

Navigating an unfamiliar indoor environment can be a difficult task. This is especially true for large and/or complex environments such as corporate offices, university campuses, and/or hospitals. Moreover, common navigation technologies such as the Global Positioning System (GPS) may not work in indoor environments due to weak signals and lack of precision. Consequently, many existing indoor navigation systems utilize various radio frequency (RF), Wi-Fi, and Bluetooth signals in conjunction with computer vision and sensor-based solutions to pinpoint a user's location.

However, such technologies can impose several technical challenges that may be impractical for large indoor environments. For example, many conventional indoor navigation systems require the user to provide accurate and detailed floorplans that can be time consuming and difficult to produce. In addition, traditional techniques for parsing maps may fail to capture subtle connections between different areas of the indoor environment leading to incomplete or inaccurate navigation guidance. This can be further exacerbated by complex indoor environment layouts with multiple floors, wings, and/or other interconnected spaces, as well as indoor environments that include multiple buildings as well as certain outdoor elements such as courtyards and walkways that enable traversal (e.g., walking, rolling) between different buildings that are located within the same campus. In another example, sensor-based solutions such as computer vision may lack global knowledge of the indoor environment. That is, while a computer vision system can identify and analyze its immediate environment, such systems typically do not maintain knowledge of the overall indoor environment which can negatively impact indoor navigation assistance.

It is with respect to these and other considerations that the disclosure made herein is presented.

SUMMARY

The techniques presented herein are directed to a system for automated navigation assistance in indoor environments. As mentioned above, navigating an unfamiliar indoor environment can be a daunting task. This is especially true for large indoor environments such as corporate offices, university campuses, shopping centers, and hospitals that typically include multiple buildings as well as certain outdoor elements such as courtyards and walkways that enable traversal (e.g., walking, rolling) between different buildings that are located within the same campus. Accordingly, the present system utilizes a reference database containing information associated with the indoor environment such as images, annotations describing the images, and floorplans illustrating the layout of the indoor environment. The reference database is deployed in conjunction with a multimodal language model that utilizes the collected knowledge of the reference database to provide location identification and intuitive navigation instructions. Often referred to as retrieval-augmented generation (RAG), the reference database enables the multimodal language model to respond to user requests using domain-specific information and ensure accurate outputs that are relevant to an end user's context (e.g., the indoor environment).

In various examples, the reference database is configured by an administrative user such as a technician, an engineer, or a system administrator. Generally described, the administrative user captures an image depicting the indoor environment in various locations (e.g., with a smartphone, with a 360-degree camera). In addition, the administrative user includes an annotation comprising a text string describing the visual content of the image and its location within the indoor environment. For instance, an image depicting a specific location in a cafeteria can include an annotation that reads, "a salad bar in front of the smoothie shop, next to the main entrance."

To enable the multimodal language model to process the information stored in the reference database, the present system utilizes a translation module to calculate a numerical representation of the reference image and the associated annotation. Often referred to as embeddings, the numerical representation is a mathematical structure that captures the semantic content of the reference image and the associated annotation (e.g., a multidimensional vector). More specifically, the numerical representation can contain hundreds of different dimensions, each linked to a specific property of the reference image and the associated annotation. In addition, as a numerical representation that captures the semantics of both image and text content, the numerical representation is said to be a multimodal numerical representation.

Accordingly, the numerical representation is stored in a reference database that is configured to store and utilize numerical representations (e.g., a vector database). In various examples, the reference database enables indexing and/or searching across large unstructured or semi-unstructured datasets. As both data and artificial intelligence models become more sophisticated and thus more complex, such systems require resource-efficient ways to store, search, and otherwise work with large datasets. Examples of such databases include CHROMA, MILVUS, PINECONE, and WEAVIATE.

In addition to the numerical representation of the reference image and annotation, the administrative user can provide a map of the indoor environment that provides the multimodal language model with a global context of the indoor environment. In a specific example, the map is an existing architectural plan that was prepared for construction of the indoor environment. In another example, the map is a hand-drawn floor plan. That is, irrespective of the complexity of the map, the multimodal language model can parse the map and associate the reference images with specific locations within the indoor environment as defined by the map. For example, the multimodal language model can associate a reference image depicting the main entrance (as indicated by its annotation) with a location on the map that is labeled as the main entrance.

Once the reference database is configured and sufficiently populated with reference images, annotations, and maps, the system can begin serving users. In a specific example, an end user accesses a user interface providing an interactive user experience by activating a trigger such as a quick-response (QR) code with their user device (e.g., a smartphone, a tablet). In another example, the interactive user experience is activated in response to positional data indicating that the user device associated with the end user has entered the indoor environment. In various examples, the positional data is obtained via a near-field communication (NFC) tag, a Wi-Fi connection, a Bluetooth signal, or other suitable method.

Accordingly, the user provides an input image of their immediate surroundings which is processed by the translation module to calculate a numerical representation of the input image. The multimodal language model can then analyze the numerical representation of the input image and perform a similarity search against the reference database to identify the current position of the user device within the indoor environment.

After identifying the current position of the user device, the user subsequently provides a natural language input (e.g., a query) that includes a user-defined objective. For example, a user entering a cafeteria can state that "I am looking for a healthy lunch". In response, the multimodal language model analyzes the natural language input and searches the reference database for relevant information (e.g., annotations of reference image). For instance, the multimodal language model can identify an annotation describing a reference image depicting a restaurant that serves fresh fruit and salads which, statistically, are often associated with "a healthy lunch". Accordingly, the multimodal model identifies the restaurant as the destinations.

With a destination now identified, the multimodal language model outputs a sequence of natural language directions that defines a path from the user's current position to the destination. In various examples, the natural language directions are composed with relation to visual landmarks within the indoor environment. For instance, one of the natural language directions can instruct the user to "head toward the lift lobby and turn right passing the sandwich restaurant on your left". In this way, the directions provided by the multimodal language model are more intuitive and human-like in contrast to directions one might typically experience when driving with a GPS for example.

By taking advantage of the strong visual and textual performance of the multimodal language model, the system enables administrative users to build thorough reference databases with minimal technical hassle. That is, administrative users can provide reference images and natural language annotations without needing to specially prepare the data as is common in many artificial intelligence systems. Consequently, this enables an administrative user to provide a larger volume of data which may not have been possible had the administrative user needed to prepare the data in a specific manner thereby increasing the coverage and thus accuracy of the reference database.

In another example of the technical benefit of the present disclosure, the multimodal language model enhances the end user experience by eliminating the need for specialized sensors and/or devices thereby increasing simplicity and reducing friction. For instance, end users can engage with the system by taking a picture with an existing device (e.g., a smartphone, a tablet). Likewise, the user experience can be provided through a web-based interface in the user's preferred device rather than a separate device. Moreover, navigation instructions that are based on the visual landmarks within the indoor environment further reduce the friction through greater intuitiveness and readability.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, language model inputs, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques presented herein are directed to a system for automated navigation assistance in indoor environments. As mentioned above, navigating an unfamiliar indoor environment can be challenging. This is especially true for large and/or complex environments such as corporate offices, university campuses, shopping centers, and hospitals that include multiple buildings as well as certain outdoor elements such as courtyards and walkways that enable traversal (e.g., walking, rolling) between different buildings that are located within the same campus. Moreover, many existing navigation assistance systems rely on complex and/or specialized hardware that can place an onerous technical burden on both end users and administrative users. Accordingly, the present system utilizes a reference database in conjunction with a multimodal language model to provide intuitive and accurate navigation assistance through retrieval-augmented generation (RAG).

Various examples, scenarios, and aspects related to the techniques are described below with respect to FIGS. 1-7.

Figure 1:
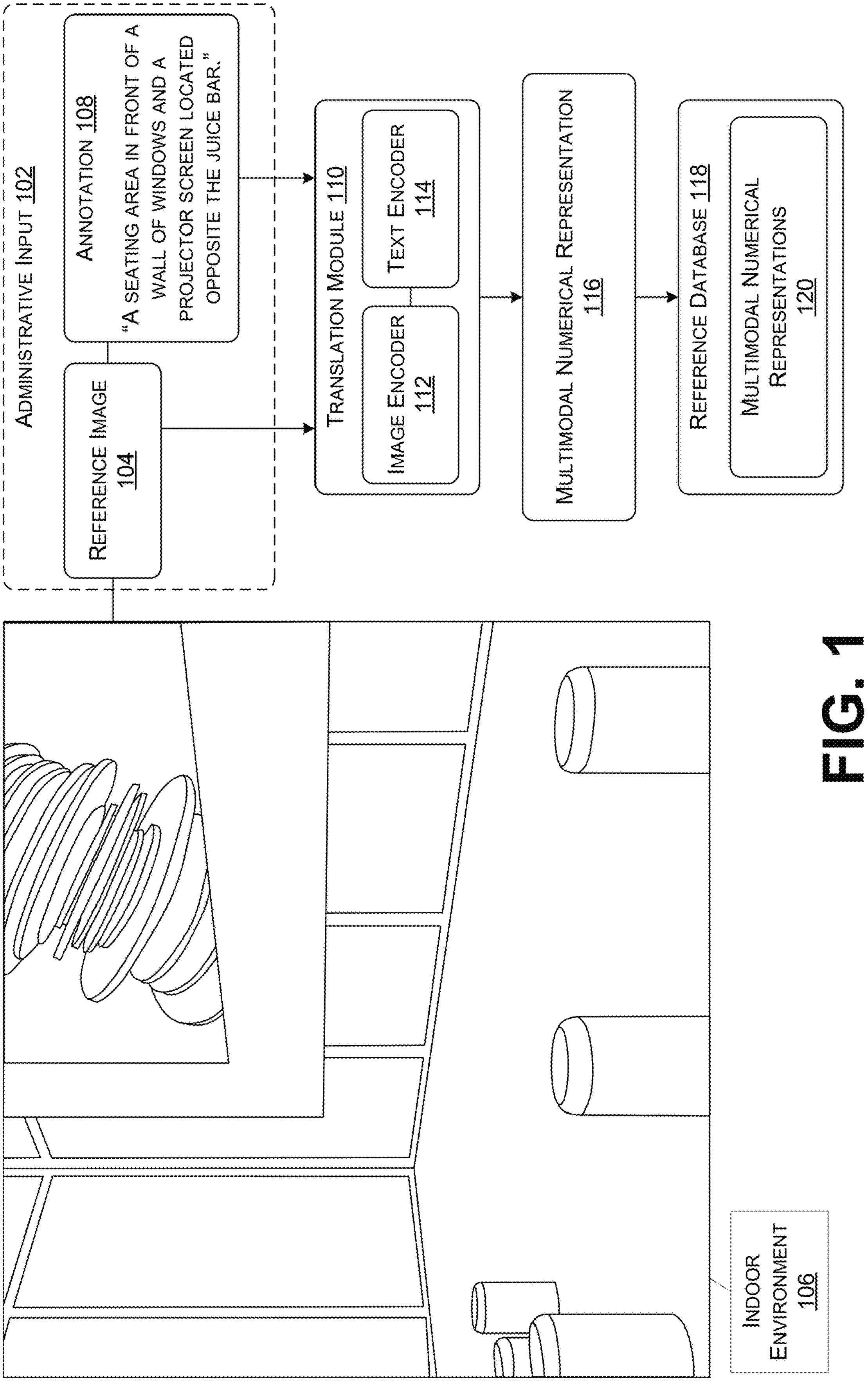
FIG. 1 illustrates an example administrative workflow for configuring a reference database with a reference image and natural language annotation.

FIG. 1 illustrates an example administrative workflow for configuring a reference database in preparation for indoor location and navigation assistance services. As shown, an administrative input 102 comprises a reference image 104 depicting a location within an indoor environment 106 and a natural language annotation 108 describing the location depicted by the reference image 104. For instance, in the present example, the annotation 108 states that the reference image 104 depicts "a seating area in front of a wall of windows and a projector screen located opposite the juice bar."

The administrative input 102 is then processed by a translation module 110 to format the semantic content of the reference image 104 and its associated annotation 108 for compatibility with automated analysis systems (e.g., large language models, small language models). In various examples, the translation module 110 is an artificial intelligence (AI) model that is configured to encode image and/or text data into a mathematical structure (e.g., a multidimensional vector) that captures the semantic content of the image and/or text data, often referred to as an embedding (e.g., a vector embedding). Examples of encoding models include text embedding models such as UNIVERSAL SENTENCE ENCODER (USE) by GOOGLE and TEXT-EMBEDDING-3 by OPENAI, as well as multimodal embedding models such as CLIP by OPENAI and TITAN by AMAZON.

In the present example, the translation module 110 comprises an image encoder 112 and a text encoder 114 that are trained to maximize the similarity of image/text pairs (e.g., the reference image 104 and the associated annotation 108). Consequently, the resulting numerical representation is a multimodal numerical representation 116 that associates the text description of the annotation 108 with the visual content of the reference image 104. More specifically, the translation module 110 embeds the semantic content of the reference image 104 and the annotation 108 within the same latent space such that an image depicting a given subject (e.g., a chair, a window) is mathematically similar to a textual description of the given subject. In this way, the multimodal numerical representation 116 is semantically robust which enhances the reliability and accuracy of downstream operations such as a similarity search.

The multimodal numerical representation 116 is then stored in a reference database 118 (e.g., a vector database) that is configured to efficiently store and operate on a plurality of multimodal numerical representations 120. In various examples, the reference database 118 enables indexing and/or searching across large unstructured or semi-unstructured datasets. As mentioned above, as both data and artificial intelligence models become more sophisticated and thus more complex, such systems require resource-efficient ways to store, search, and otherwise work with large datasets. Examples of such databases include CHROMA, MILVUS, PINECONE, and WEAVIATE.

Figure 2A:
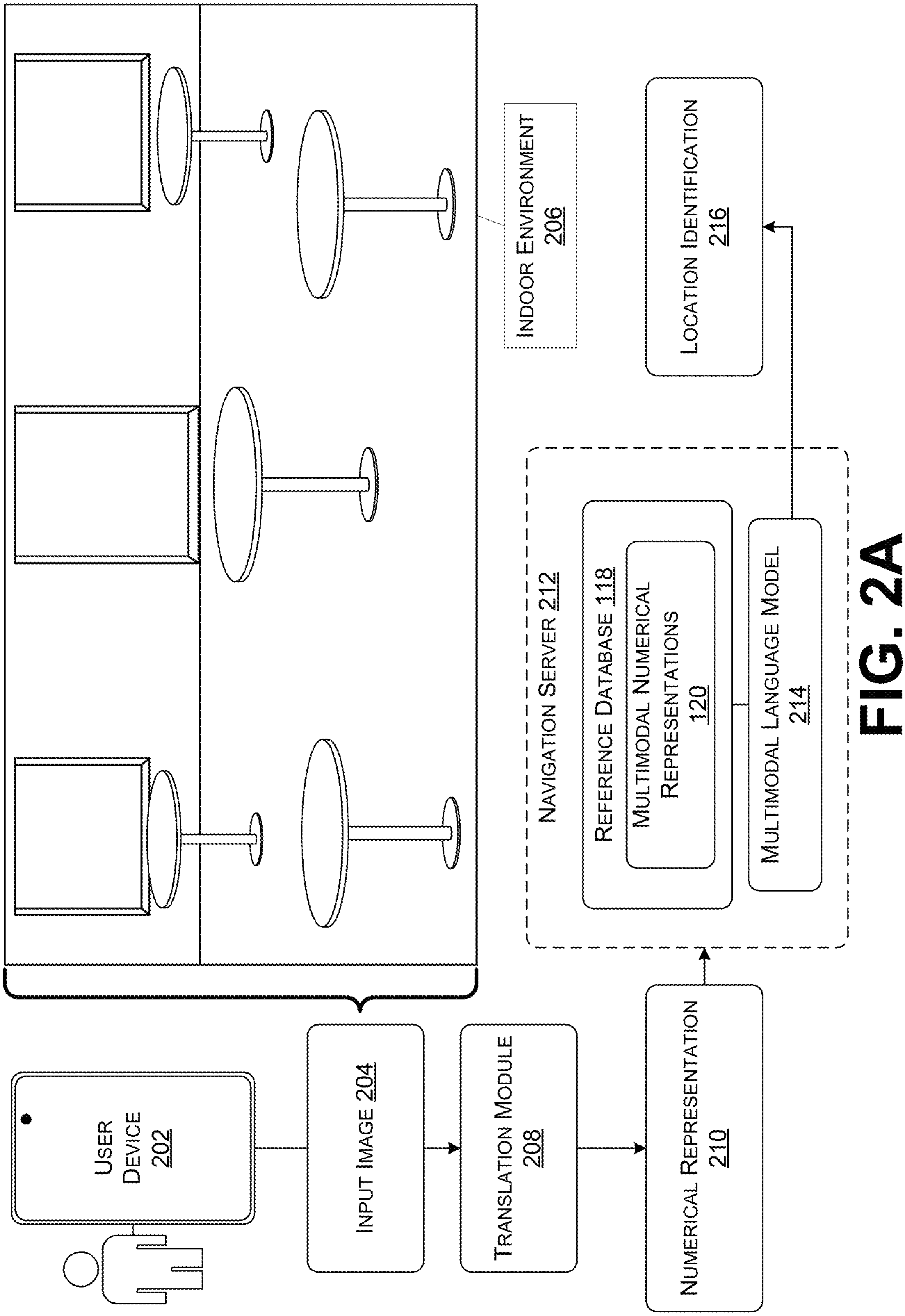
FIG. 2A illustrates an example end user workflow for identifying the end user's current position within an indoor environment.

Turning now to FIG. 2A, aspects of an example end user workflow for location identification are shown and described. As mentioned above, an end user can access an interactive user experience via their user device 202 by activating a trigger. In a specific example, an end user accesses the interactive user experience scanning as a quick-response (QR) code with their user device (e.g., a smartphone, a tablet). In another example, the interactive user experience is activated in response to positional data indicating that the user device associated with the end user has entered the indoor environment. In various examples, the positional data is obtained via a near-field communication (NFC) tag, a Wi-Fi connection, a Bluetooth signal, or other suitable method.

Accordingly, the end user captures an input image 204 depicting the current position of the user device 202 within an indoor environment 206. Similar to the examples discussed above, the input image 204 is processed by a translation module 208 to formats the semantic content of the input image 204 into a numerical representation 210 (e.g., a multidimensional vector) that is compatible with computational analysis tools (e.g., large language models, small language models).

The numerical representation 210 of the input image 204 is subsequently input to a navigation server 212 comprising a multimodal language model 214 and the reference database 118 configured as described above with respect to FIG. 1. As mentioned, the multimodal language model 214 utilizes the collected knowledge of the reference database 118 to produce outputs using domain-specific information that are accurate and relevant to an end user's context (e.g., the indoor environment 206), often referred to as retrieval-augmented generation (RAG).

Accordingly, the multimodal language model 214 analyzes the numerical representation 210 of the input image 204 and performs a similarity search against the plurality of multimodal numerical representations 120 stored in the reference database 118. That is, the multimodal language model 214 compares the features encoded by the numerical representation 210 against known features encoded by the multimodal numerical representations 120 which are calculated from both text and image inputs (e.g., the administrative input 102). Consequently, the multimodal language model 214 outputs a location identification 216 based on the similarity search that identifies the current position of the user device 202 in natural language (e.g., "inside the main entrance of Building 1, near the reception area").

Figure 2B:
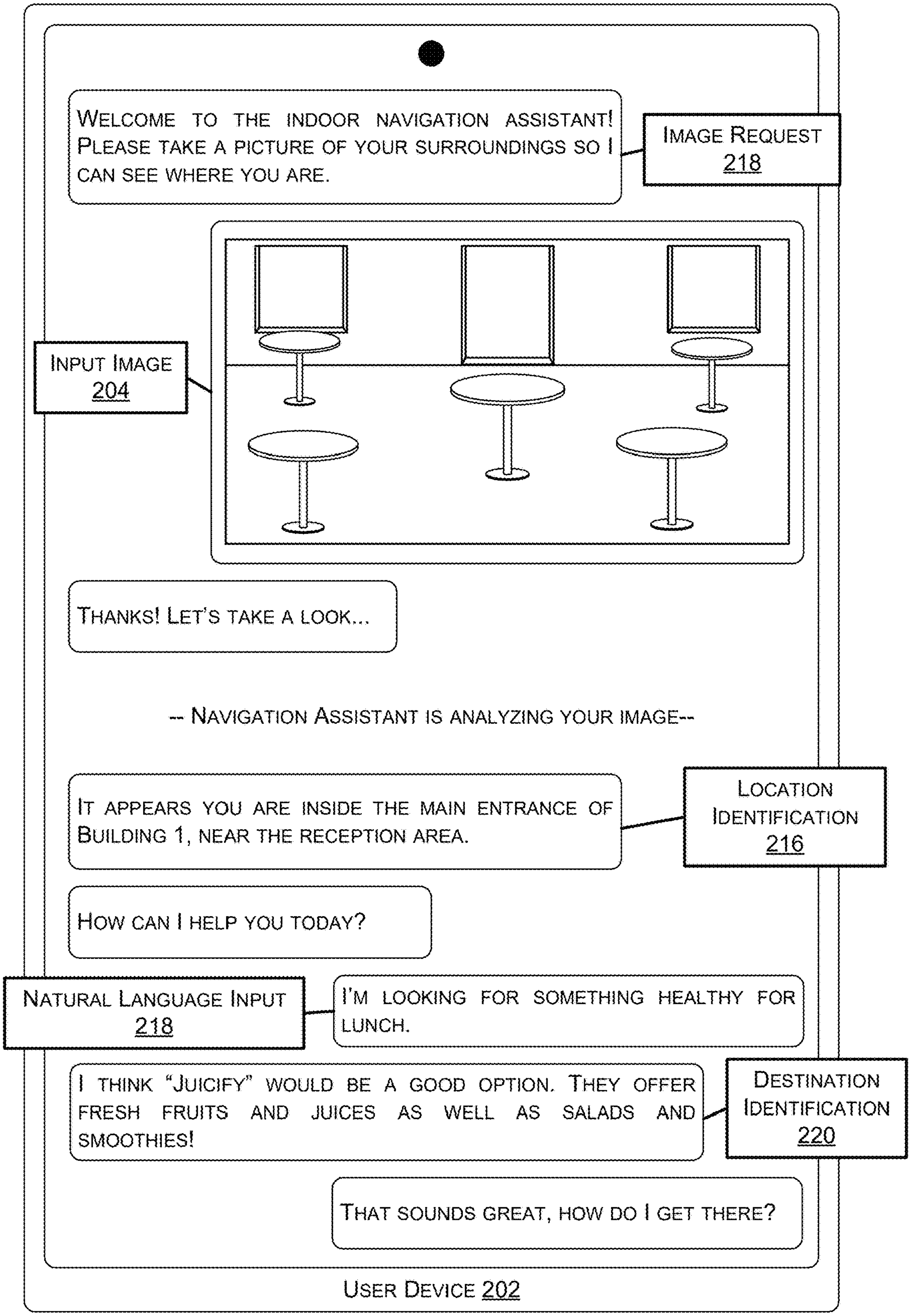
FIG. 2B illustrates an example graphical user interface that enables interaction with a multimodal language model to receive location identification.

Turning now to FIG. 2B, an example of an end user interaction with the multimodal language model 214 via the navigation server 212 is shown and described. As mentioned above, an end user can access a navigation assistance user experience by activating a trigger such as scanning a quick-response (QR) code with a user device 202 (e.g., a smartphone, a tablet) or via positional data indicating that the user has entered the indoor environment. To initialize the user experience, the multimodal language model 214 outputs an image request 218 to identify the current position of the user device 202 within the indoor environment. In response, the end user uploads an input image 204 depicting the current position of the user device 202.

The multimodal language model 214 proceeds to analyze the input image 204 as described above with respect to FIG. 2A using a similarity search to identify the current position of the user device 202. After some processing time, the multimodal language model 214 outputs the location identification 216 as a natural language output (e.g., "It appears you are inside the main entrance of Building 1, near the reception area."). The end user can then provide a natural language input 218 (e.g., natural language query) comprising a user-defined objective (e.g., "something healthy for lunch."). The multimodal language model 214 processes the natural language input 218 similarly to the input image 204. That is, the natural language input 218 is translated into a numerical representation (e.g., a text embedding) which the multimodal language model 214 uses to search the reference database 118 for a suitable answer.

As shown, the multimodal language model 214 outputs a destination identification 220 suggesting a restaurant that serves fresh fruit and salads which are statistically associated as "healthy". In this way, the multimodal language model 214 enables open-ended interaction that reduces friction and increases convenience for the end user. For instance, the present example illustrates an end user that has a vague notion of a destination (e.g., "something healthy for lunch") rather than a specific location in mind. Nonetheless, the multimodal language model 214 assists the end user in identifying a suitable destination whereas a conventional navigation system would require the user to be familiar with available locations and/or options. In another example, an end user may enter a hospital seeking treatment for a particular ailment (e.g., "I am having difficulty hearing."). Accordingly, the multimodal language model 214 can direct the end user to an ear, nose, and throat doctor.

Figure 2C:
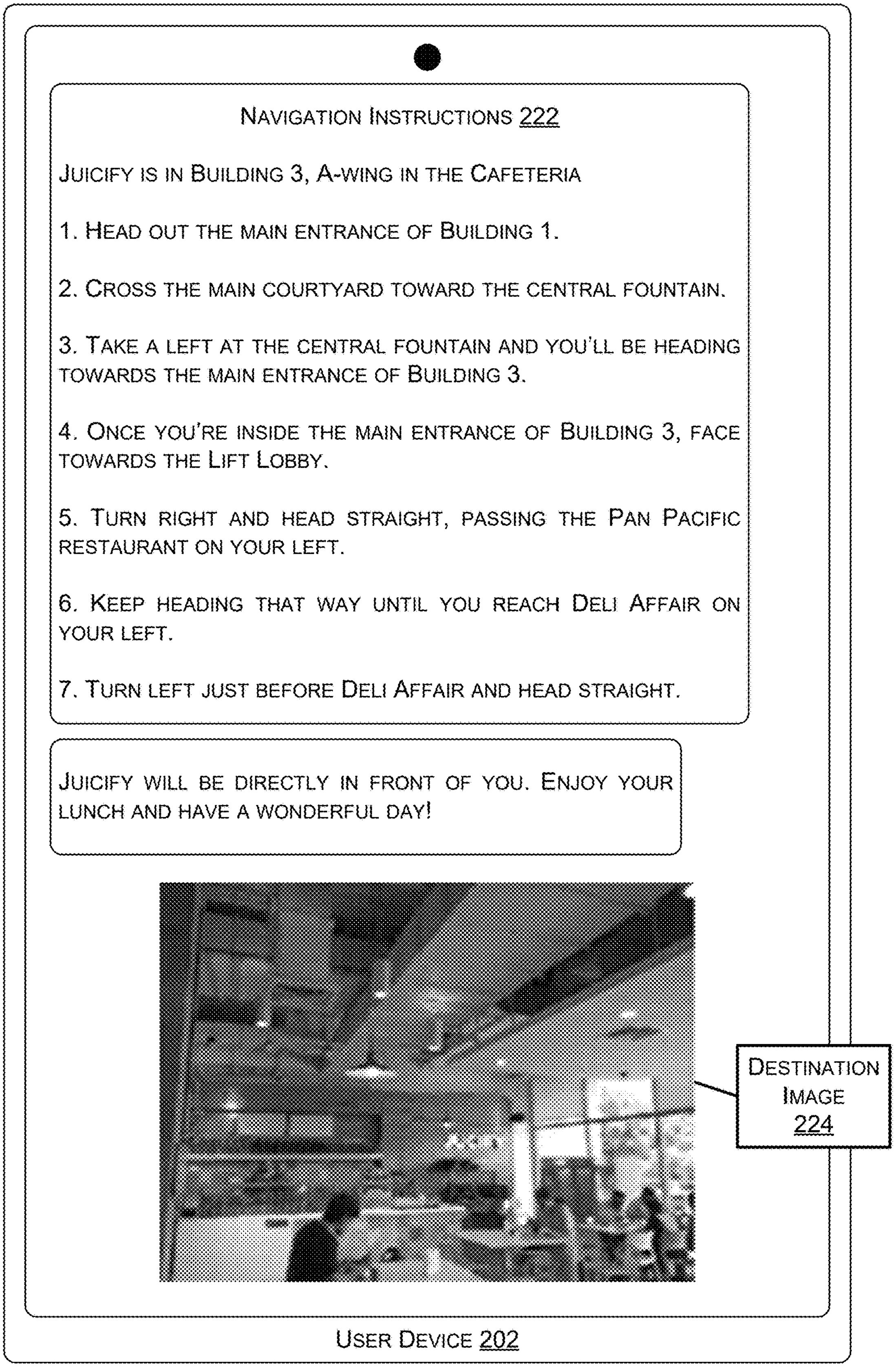
FIG. 2C illustrates an example graphical user interface that enables interaction with a multimodal language model to receive navigation instructions.

Turning now to FIG. 2C, an example set of navigation instructions are shown and described. As described above, the multimodal language model 214 previously identified an end user's current position from an input image 204 "inside the main entrance of Building 1, near the reception area") and identified a destination for the end user from a natural language input 218 ("Juicify is in Building 3, A-wing in the cafeteria"). In the present example, the current position of the end user and the destination are in different buildings that are part of the same overall indoor environment (e.g., a corporate office campus). That is, within the context of the present disclosure, an indoor environment-especially large environments—can include multiple buildings as well as certain outdoor elements such as a courtyard and walkways between different buildings that are located within the same campus.

As will be discussed further below, a navigation server for such an indoor environment includes a floor plan database wherein individual floor plans map out various sections of the indoor environment (e.g., a floor in a building). As such, the floor plan database can be organized as a graph data structure in which individual floor plans are nodes that are connected by edges that ultimately converge on a root node representing the overall indoor environment (e.g., the campus). Accordingly, navigation server 212 can be configured to traverse the graph data structure to retrieve a subset of floor plans such that the multimodal language model 214 has sufficient information to navigate from the end user's current position to the destination without having to analyze the full floor plan database thereby conserving significant computing resources and reducing latency.

As shown in FIG. 2C, the navigation instructions 222 are formatted in a human-like prose, utilizing visual landmarks (e.g., central fountain, lift lobby) to guide the end user. In addition, the navigation instructions 222 include a destination image 224 to further aid the end user. This is in contrast to many conventional navigation systems that are limited to directing the end user with distances that can be opaque and/or confusing (e.g., "turn left in 300 meters"). In this way, the navigation instructions 222 provide a simplified and engaging user experience that reduces friction while improving readability and intuitiveness.

Figure 3:
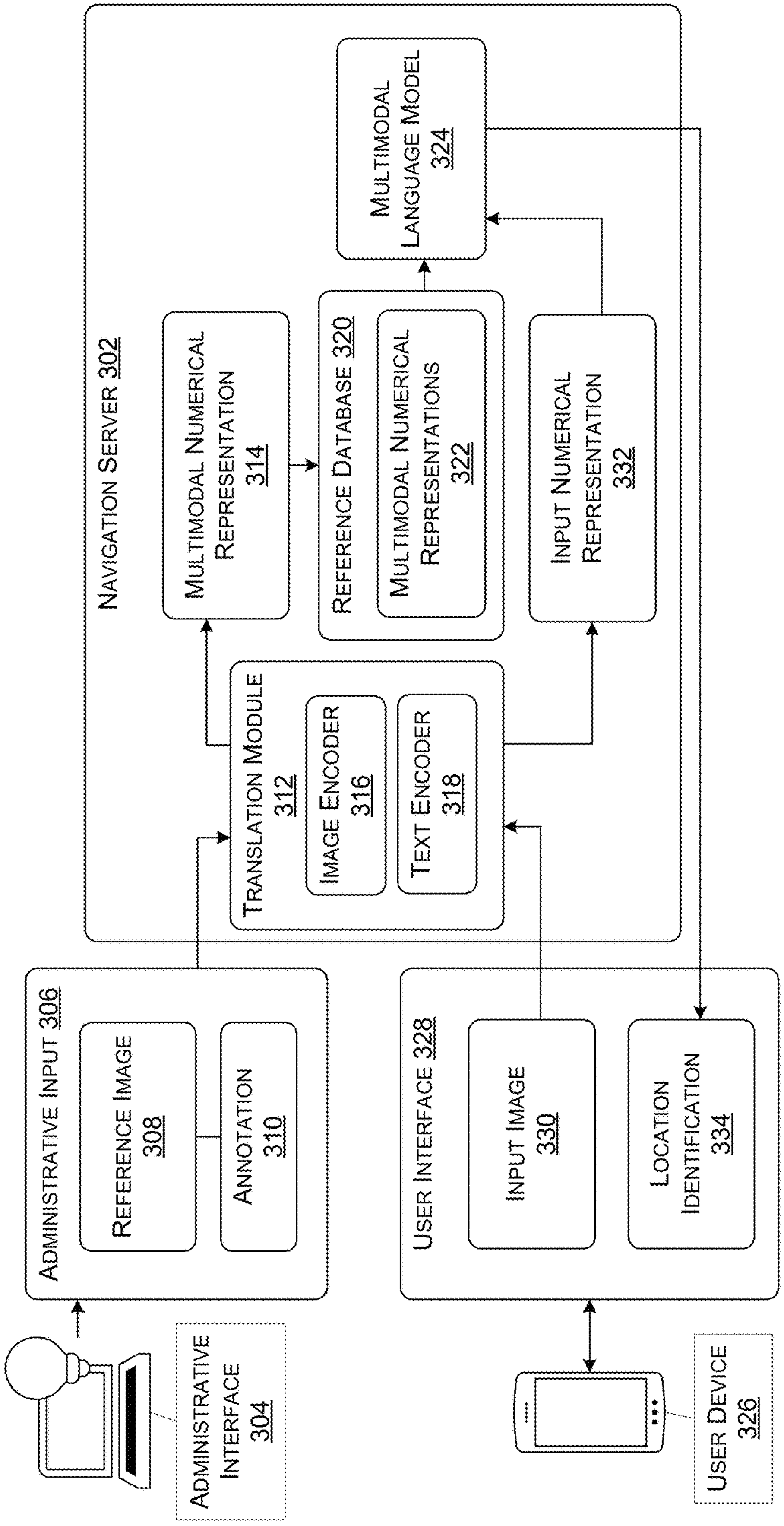
FIG. 3 is a block diagram of an example system for configuring a reference database with reference images and annotations to enable a multimodal language model to provide location identification services.

Proceeding to FIG. 3, a system for configuring a navigation server 302 to provide location identification services is shown and described. As discussed above with respect to FIG. 1, an administrative user (e.g., a technician, an engineer, a system administrator) utilizes an administrative interface 304 to submit an administrative input 306 comprising a reference image 308 and a natural language annotation 310. In various examples, the reference image 308 depicts a location within an indoor environment while the annotation 310 describes the depicted location in a natural language (e.g., English). For instance, a reference image 308 depicting a restaurant in a cafeteria can include an annotation 310 stating "Joe's Burgers, serves American food such as hamburgers and fries, located to the left of the main entrance of the cafeteria next to Juicify and across from Greenies." In this way, the administrative input 306 includes robust semantic content that is descriptive of the immediate subject (e.g., "Joe's Burgers") and places the subject within a contextual location in relation to nearby visual landmarks (e.g., "left of the main entrance of the cafeteria next to Juicify and across from Greenies").

The administrative input 306 is then processed by a translation module 312 which calculates a multimodal numerical representation 314 of the semantic content captured by the reference image 308 and the annotation 310. As mentioned above, the multimodal numerical representation 314 formats the semantic content of the reference image 308 and its associated annotation 310 for compatibility with automated analysis systems (e.g., large language models, small language models).

Accordingly, the translation module 312 comprises an image encoder 316 and a text encoder 318 that are trained to maximize the similarity of image/text pairs (e.g., the reference image 308 and the associated annotation 310). Consequently, the resulting multimodal numerical representation 314 is multimodal in that it associates the text description provided by the annotation 310 with the visual content of the reference image 308. More specifically, the translation module 312 embeds the semantic content of the reference image 308 and the annotation 310 within the same mathematical space such that an image depicting a given subject (e.g., a chair, a window) results in a numerical representation (e.g., a multidimensional vector) that is mathematically similar to a numerical representation of a textual description of the given subject.

The multimodal numerical representation 314 is then stored in a reference database 320 that is configured to efficiently store and operate on a plurality of multimodal numerical representation2 322. Collectively, these multimodal numerical representations 322 form the body of knowledge regarding the indoor environment that describes the contents of the indoor environment (e.g., names of restaurants, room/office numbers, departments), the location of these contents in relation to visual landmarks, the general function of these contents, (e.g., vegetarian restaurant, cafeteria, oncology department) and so forth. Accordingly, a multimodal language model 324 draws on the information of the reference database to analyze and respond to user requests.

For example, an end user can access the navigation server 302 via a user device 326 (e.g., a smartphone, a tablet). As mentioned above, the user device 326 can access a user interface 328 by activating a trigger such as a QR code that is located within the indoor environment. For example, a QR code may be placed at the main entrance to a building so that the end user can begin navigating upon entry. In another example, a QR code is placed at common locations at which an end user may seek navigation assistance such as a directory kiosk in a shopping center. Accordingly, the end user provides an input image 330 depicting their current position within the indoor environment. Similar to the administrative input 306 above, the input image 330 is processed by the translation module 312 to calculate an input numerical representation 332. The input numerical representation 332 is passed to the multimodal language model 324 which performs a similarity search against the reference database 320. By utilizing the multimodal numerical representations 322, the multimodal language model 324 can find matches to the input image 330 in both image data (e.g., the reference image 308) and text data (e.g., the annotation 310). In response to the input image, the multimodal language model 324 outputs a location identification 334 (e.g., "It appears you are inside the main entrance of Building 1, near the reception area.").

Figure 4:
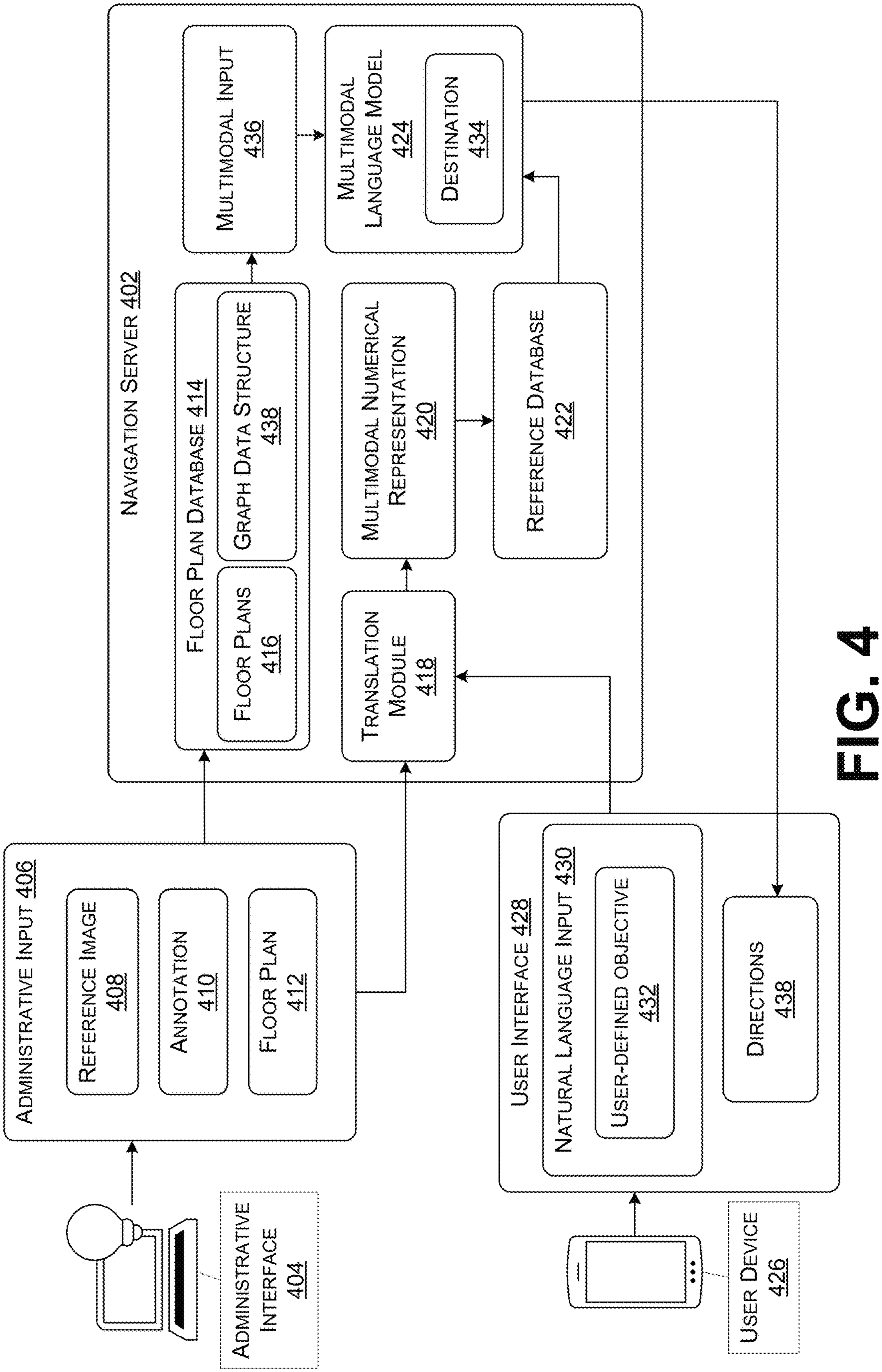
FIG. 4 is a block diagram of an example system for further configuring a reference database with floor plans to enable a multimodal language model to provide navigation directions.

Proceeding now to FIG. 4, aspects of a system for configuring a navigation server 402 via map parsing to enable navigation assistance features are shown and described. Similar to the discussion above with respect to FIG. 3, an administrative user (e.g., a technician, an engineer, a system administrator) configures the navigation server 402 via an administrative interface 404 (e.g., an internal application) and an administrative input 406. In various examples, the administrative input 406 includes a reference image 408 depicting a specific location within an indoor environment and a natural language annotation 410 describing the depicted location. In addition, the administrative input 406 includes an image of a floor plan 412 depicting various visual landmarks in relation to each other (e.g., showing the location of bathrooms in relation to elevators).

Accordingly, the floor plan 412 is stored in a floor plan database 414 that is configured to store a plurality of floor plans 416. In various examples, the floor plans 416 cover the full indoor environment (e.g., a corporate campus) in which individual floor plans depict specific sections of the indoor environment (e.g., floors of a building). Conversely, the reference image 408 and annotation 410 are processed by a translation module 418 to calculate a multimodal numerical representation 420 which is stored in a reference database 422 similar to the examples described above. In this way, the reference database 422 enables a multimodal language model 424 to learn of specific locations (e.g., restaurants, offices) and their immediate surroundings while the floor plan database 414 enables the multimodal language model 424 to situate these specific locations within a broader context (e.g., a building floor, a wing, a campus). That is, a given reference image 408 is stored in association with a specific location within an associated floor plan 412.

As mentioned above, the floor plan 412 can be an architectural diagram (e.g., a blueprint) accurately illustrating specific layouts, measurements, and other aspects of the indoor environment. That is, the architectural diagram is the specification to which the indoor environment was originally constructed. In another example, the floor plan 412 is a hand-drawn sketch illustrating a general layout of the indoor environment with various visual landmarks being shown in relation to each other (e.g., showing the location of bathrooms in relation to elevators). That is, by leveraging the strong visual identification performance of the multimodal language model 424, the navigation server 402 enables support for a broad spectrum of floor plans 412 without requiring the administrative user to obtain or construct specialized data.

Subsequently, after the floor plan database 414 and the reference database 422 are configured, an end user utilizes a user device 426 (e.g., a smartphone, a tablet) to access a user interface 428 to seek navigation assistance. After identifying the end user's current position within the indoor environment as described above with respect to FIG. 3, the end user can input a natural language input 430 that includes a user defined objective 432. For instance, in a natural language input 430 stating "I'm looking for something healthy for lunch," the user-defined objective 432 is "something healthy for lunch".

In response, the multimodal language model 424 identifies a destination 434 that satisfies the user-defined objective 432 by searching the reference database 422 using the information provided by the natural language input 430. In a simple example, a user-defined objective 432 of "something healthy for lunch" can cause the multimodal language model 424 to identify a restaurant that serves salads as the destination 434 due to common statistical relationships between words such as "salads", "healthy", and "lunch".

Upon confirmation from the end user that the destination 434 is satisfactory, the navigation server 402 constructs a multimodal input 436 that causes the multimodal language model 424 to output a sequence of natural language directions 438 that guide the end user to the destination 434. In various examples, the multimodal input 436 includes the end user's current position, the destination 434, and one or more of the floor plans 416 retrieved from the floor plan database 414. In a simple example, the end user's current position and the destination 434 are located within the same floor plan. Accordingly, the navigation server 402 retrieves the single floor plan from the floor plan database 414 for the multimodal input 436.

However, in some scenarios, the end user's current position and the destination 434 may be located in different floor plans (e.g., different floors, different buildings). As such, the navigation server 402 retrieves a minimum number of the floor plans 416 that enable the multimodal language model 424 to construct a path from the end user's current position to the destination 434. In a specific example, consider a floor plan database 414 containing a first number of floor plans (e.g., two hundred floor plans). In this example, the floor plan database 414 is organized as a graph data structure 438 in which individual ones of the floor plans 416 correspond to nodes. These nodes are connected by edges representing connections between individual floor plans. For instance, the eighth floor and the second floor of a given building are connected to represent elevator and/or stair access between the seventh floor and the eighth floor.

The edges of the graph data structure 438 ultimately converge on a root node representing the overall indoor environment (e.g., the corporate office, the university campus). That is, the convergence on the root node represents the fact that descending from an upper floor of a given building to the ground floor enables one to then exit the building and access other buildings. To plot the path from the end user's current position to the destination 434, the navigation server 402 is configured to first identify a starting node corresponding to the current position of the end user and a destination node corresponding to the destination 434.

The navigation server then traverses the graph data structure 438 to identify a route through the graph data structure 438 that connects the starting node and the destination node while using the fewest number of traversals (e.g., hops) between nodes. Accordingly, the nodes contained in the route through the graph data structure 438 correspond to one or more of the floor plans 416. That is, the route identifies a subset of the floor plans 416 such that the multimodal language model 424 has sufficient information to navigate from the end user's current position to the destination 434 without having to retrieve and/or analyze the entirety of the floor plan database 414 thereby significantly conserving computing resources and reducing latency.

In a specific example, consider a floor plan database 414 for a large corporate office comprising several multi-floor buildings. Consequently, the number of floor plans 416 is commensurately large (e.g., hundreds, thousands). However, navigating an end user that needs to get from the eighth floor of Building A to the first floor of Building C may only require a few floor plans (e.g., four). That is, the subset of the floor plans 416 identified by the route traversing the graph data structure 438 is less, sometimes significantly less, than the total number of floor plans 416 in the floor plan database 414.

Figure 5:
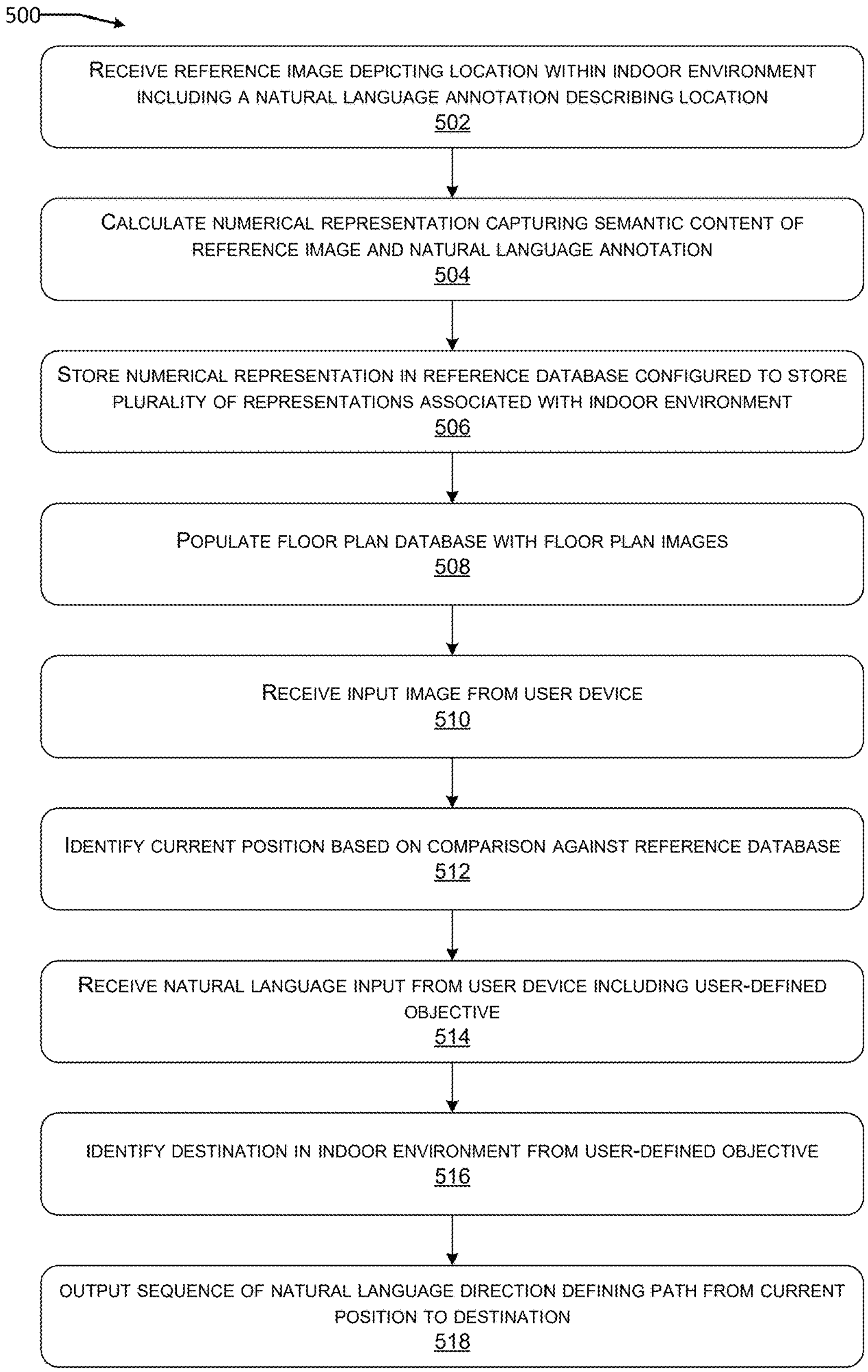
FIG. 5 is a flow diagram showing aspects of a process for automated navigation assistance in indoor environments.

Turning now to FIG. 5, aspects of a process 500 for automated navigation assistance in indoor environments are shown and described. With respect to FIG. 5, the process 500 begins at operation 502 where the system receives a reference image depicting a location within the indoor environment including a natural language annotation describing the location depicted by the reference image. Discussed above as an administrative input, the reference image and the annotation are unstructured data meaning that the reference image and the annotation were not specifically prepared for consumption by artificial intelligence systems. This is enabled by taking advantage of the strong visual and textual performance of multimodal language models. In this way the system enables administrative users to build thorough reference databases with minimal technical hassle. That is, administrative users can provide reference images and natural language annotations without needing to specially prepare the data as is common in many artificial intelligence systems.

Next, at operation 504, the system calculates a numerical representation capturing a semantic content of the reference image and the natural language annotation. As described above, the numerical representation can be a multimodal numerical representation that embeds the semantic content of both image and text data in a mathematical structure that is compatible with artificial intelligence systems (e.g., large language models, small language models). That is, the semantic content of the reference image and the annotation are embedded within the same latent space such that an image depicting a given subject (e.g., a chair, a window) is mathematically similar to a textual description of the given subject.

Proceeding to operation 506, the system stores the numerical representation in a reference database that is configured to store a plurality of numerical representations associated with the indoor environment. In various examples, the numerical representation is a multidimensional vector. Accordingly, the reference database is a vector database that is specifically configured to efficiently store and operate on multidimensional vectors.

Then, at operation 508, the system populates a floor plan database with floor plan images depicting various visual landmarks of the indoor space in relation to each other. For example, a floor plan image can illustrate the location of bathrooms in relation to elevators. As discussed above, the floor plan image can be an architectural diagram (e.g., a blueprint) accurately illustrating specific layouts, measurements, and other aspects of the indoor environment. Conversely, the floor plan image can be a hand-drawn sketch illustrating a general layout of the indoor environment.

Subsequently, at operation 510, the system receives an input image from an end user via a user device (e.g., a smartphone, a tablet) depicting the current position of the user device within the indoor space. As described, the system calculates a numerical representation of the input image similar to the multimodal numerical representations mentioned above.

In response, the process 500 proceeds to operation 512 in which a multimodal language model identifies the current position of the user device based on a comparison of the numerical representation of the input image against the reference database. As mentioned above, utilizing multimodal embeddings enables the multimodal language model to perform a similarity search of the input image against both text and image data.

Next, at operation 514, the system receives a natural language input from the user device in which the natural language input includes a user-defined objective. For instance, in a natural language input stating, "I'm looking for something healthy for lunch," the user-defined objective is "something healthy for lunch".

In response, the process 500 proceeds to operation 516 in which multimodal language model identifies a destination within the indoor environment that satisfies the user-defined objective. Continuing the above example, a restaurant that serves salads would satisfy the user-defined objective of "something healthy for lunch".

Finally, at operation 518, the multimodal language model outputs a sequence of natural language directions that lead the end user from their current position to the destination. As described above, the sequence of natural language directions are formatted in a human-like prose, utilizing visual landmarks (e.g., central fountain, lift lobby) to guide the end user. That is, the directions emulate how another person might give directions. This is in contrast to many conventional navigation systems that are limited to directing the end user with distances that can be opaque and/or confusing (e.g., "turn left in 300 meters"). As discussed with respect to FIGS. 1-4, operations 502-508 are performed by an administrative entity (e.g., a technician, an engineer, a system administrator) via an administrative interface while operation 510-518 are performed by an end user via a user device (e.g., a smartphone, a tablet).

The particular implementation of the technologies disclosed herein is a matter of choice depending on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can begin and/or end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, language model inputs, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice depending on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 500 can be implemented, at least in part, by modules running the features disclosed herein can be a dynamically linked library, a statically linked library, functionality produced by an application programing interface, a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the process 500 may also be implemented in other ways. In addition, one or more of the operations of the process 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
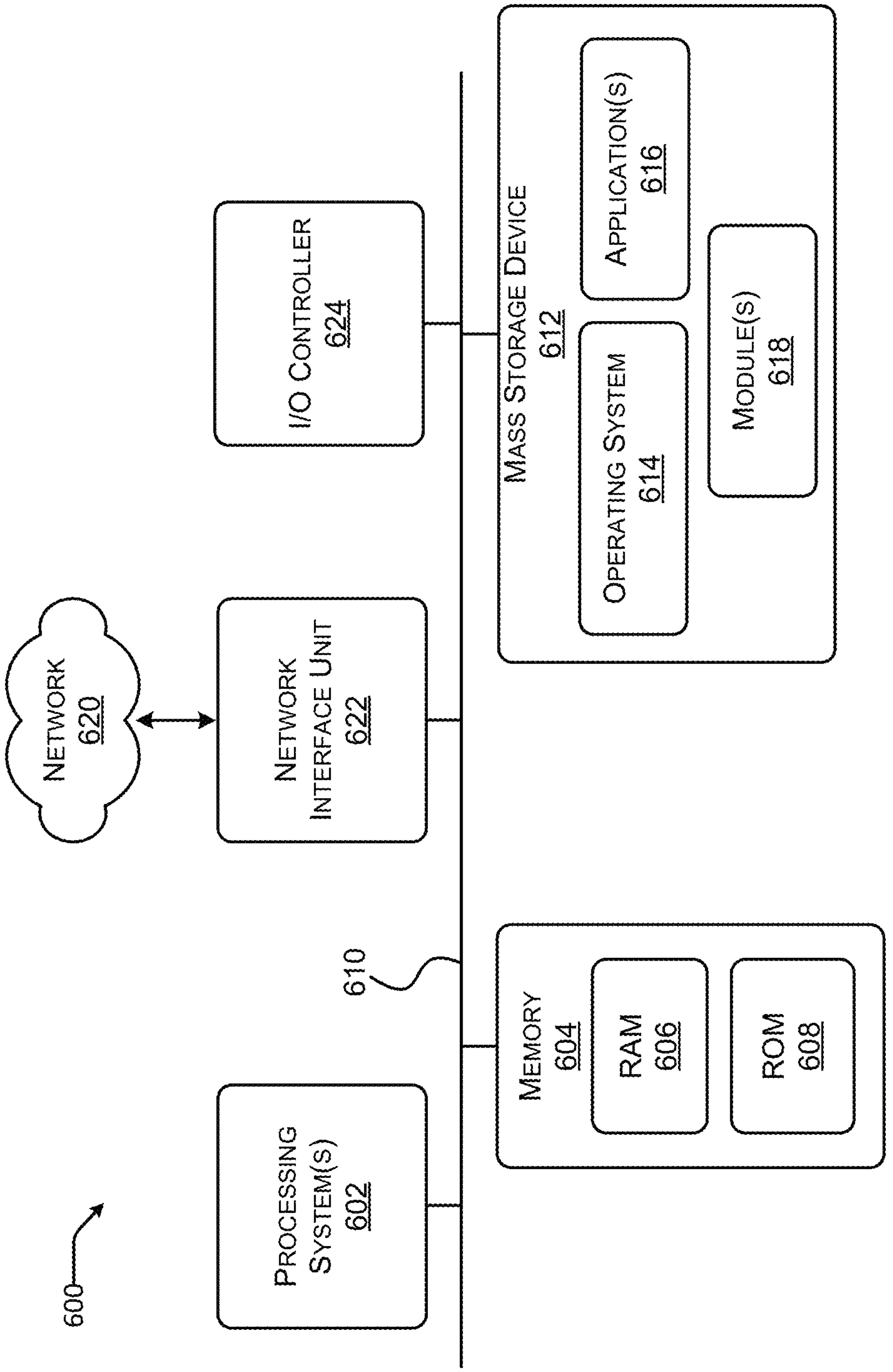
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location. Moreover, the systems discussed herein can be provided as a distributed computing system such as a cloud service.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of a volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
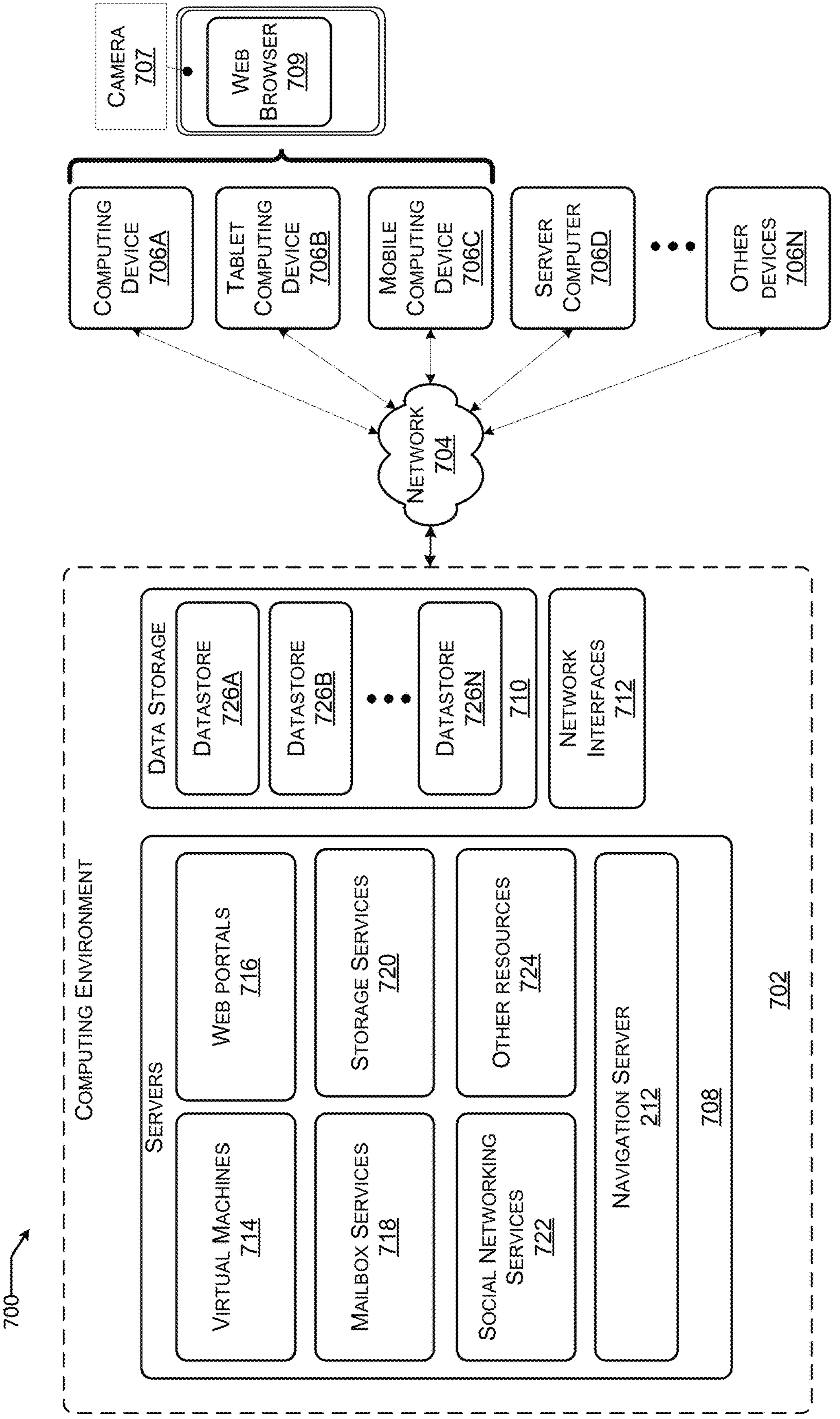
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device 706B; a mobile computing device 706C such as a mobile telephone, a smart phone, or other mobile computing device; a server computer 706D; and/or other devices 706N. It should be understood that any number of computing devices 706 can communicate with the computing environment 702. Moreover, the computing devices 706 can provide input data to the computing environment 702 such as the input images and natural language inputs described above. Accordingly, the computing devices 706 can be equipped with requisite input components such as a camera 707 and a web browser 709.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources 724 including the navigation server 212.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method for navigation assistance in an indoor environment comprising: receiving a reference image depicting a location within the indoor environment, wherein the reference image includes a natural language annotation describing the location depicted by the reference image; calculating a numerical representation of the reference image capturing a semantic content of the reference image and the natural language annotation; storing the numerical representation in a reference database that is configured to store a plurality of numerical representations of reference images and annotations associated with the indoor environment; receiving an input image from a user device, the input image depicting a current position of the user device within the indoor environment; in response to receiving the input image from the user device, identifying, by a multimodal language model, the current position of the user device based on a comparison of a numerical representation of the input image against the plurality of numerical representations stored by the reference database; receiving a natural language input from the user device, wherein the natural language input includes a user-defined objective; in response to receiving the natural language input from the user device: identifying, by the multimodal language model, a destination within the indoor environment from the user-defined objective; and outputting, by the multimodal language model, a sequence of natural language directions defining a path from the current position of the user device to the destination identified from the user-defined objective.

Example Clause B, the method of Example Clause A, wherein: the indoor environment includes a plurality of visual landmarks; and the sequence of natural language directions defines the path based on a position of the plurality of visual landmarks in relation to the current position of the user device and the destination identified from the user-defined objective.

Example Clause C, the method of Example Clause A or Example Clause B, wherein: the reference database is further configured to store a floor plan depicting a layout of the indoor environment; and the numerical representation of the reference image is stored in association a location within the floor plan.

Example Clause D, the method of Example Clause C, wherein: the indoor environment is a building comprising a plurality of floors; and the reference database stores a map image corresponding to each floor of the plurality of floors.

Example Clause E, the method of any one of Example Clause A Through D, wherein the reference database is configured to store a graph data structure comprising a plurality of nodes corresponding to a first number of floor plans depicting a layout of the indoor environment, the method further comprising: identifying a starting node of the plurality of nodes corresponding to the current position of the user device; identifying a destination node of the plurality of nodes corresponding to the destination identified from the user-defined objective; traversing the graph data structure to identify a route connecting the starting node and the destination node; retrieving a second number of floor plans from the first number of floor plans corresponding to the route, wherein the second number of floor plans is less than the first number of floor plans; and generating the sequence of natural language directions based on the second number of floor plans and the plurality of numerical representations of references images associated with the indoor environment.

Example Clause F, the method of any one of Example Clause A Through E, wherein the input image is received from the user device via an interactive user experience.

Example Clause G, the method of Example Clause F, wherein the interactive user experience is activated in response to scanning a quick-response code image using the user device.

Example Clause H, the method of Example Clause F, wherein the interactive user experience is activated in response to identifying, based on positional data received from the user device, that the user device has entered the indoor environment.

Example Clause I, a system for navigation assistance in an indoor environment comprising: a processing system; and a computer-readable medium having encoded thereon, computer-readable instructions that, when executed by the processing system, cause the system to perform operations comprising: receiving a reference image depicting a location within the indoor environment, wherein the reference image includes a natural language annotation describing the location depicted by the reference image; calculating a numerical representation of the reference image capturing a semantic content of the reference image and the natural language annotation; storing the numerical representation in a reference database that is configured to store a plurality of numerical representations of reference images and annotations associated with the indoor environment; receiving an input image from a user device, the input image depicting a current position of the user device within the indoor environment; in response to receiving the input image from the user device, identifying, by a multimodal language model, the current position of the user device based on a comparison of a numerical representation of the input image against the plurality of numerical representations stored by the reference database; receiving a natural language input from the user device, wherein the natural language input includes a user-defined objective; in response to receiving the natural language input from the user device: identifying, by the multimodal language model, a destination within the indoor environment from the user-defined objective; and outputting, by the multimodal language model, a sequence of natural language directions defining a path from the current position of the user device to the destination identified from the user-defined objective.

Example Clause J, the system of Example Clause I, wherein: the indoor environment includes a plurality of visual landmarks; and the sequence of natural language directions defines the path based on a position of the plurality of visual landmarks in relation to the current position of the user device and the destination identified from the user-defined objective.

Example Clause K, the system of Example Clause I or Example Clause J, wherein: the reference database is further configured to store a floor plan depicting a layout of the indoor environment; and the numerical representation of the reference image is stored in association a location within the floor plan.

Example Clause L, the system of Example Clause K, wherein: the indoor environment is a building comprising a plurality of floors; and the reference database stores a map image corresponding to each floor of the plurality of floors.

Example Clause M, the system of any one of Example Clause I through L, wherein: the reference database is configured to store a graph data structure comprising a plurality of nodes corresponding to a first number of floor plans depicting a layout of the indoor environment; and the operations further comprise: identifying a starting node of the plurality of nodes corresponding to the current position of the user device; identifying a destination node of the plurality of nodes corresponding to the destination identified from the user-defined objective; traversing the graph data structure to identify a route connecting the starting node and the destination node; retrieving a second number of floor plans from the first number of floor plans corresponding to the route, wherein the second number of floor plans is less than the first number of floor plans; and generating the sequence of natural language directions based on the second number of floor plans and the plurality of numerical representations of references images associated with the indoor environment.

Example Clause N, the system of any one of Example Clause I through M, wherein the input image is received from the user device via an interactive user experience.

Example Clause O, the system of Example Clause N, wherein the interactive user experience is activated in response to scanning a quick-response code image using the user device.

Example Clause P, the system of Example Clause N, wherein the interactive user experience is activated in response to identifying, based on positional data received from the user device, that the user device has entered the indoor environment.

Example Clause Q, a computer-readable storage medium for navigation assistance in an indoor environment, the computer-readable storage medium having encoded thereon, computer-readable instructions that, when executed by a system, cause the system to perform operations comprising: receiving a reference image depicting a location within the indoor environment, wherein the reference image includes a natural language annotation describing the location depicted by the reference image; calculating a numerical representation of the reference image capturing a semantic content of the reference image and the natural language annotation; storing the numerical representation in a reference database that is configured to store a plurality of numerical representations of reference images and annotations associated with the indoor environment; receiving an input image from a user device, the input image depicting a current position of the user device within the indoor environment; in response to receiving the input image from the user device, identifying, by a multimodal language model, the current position of the user device based on a comparison of a numerical representation of the input image against the plurality of numerical representations stored by the reference database; receiving a natural language input from the user device, wherein the natural language input includes a user-defined objective; in response to receiving the natural language input from the user device: identifying, by the multimodal language model, a destination within the indoor environment from the user-defined objective; and outputting, by the multimodal language model, a sequence of natural language directions defining a path from the current position of the user device to the destination identified from the user-defined objective.

Example Clause R, the computer-readable storage medium of Example Clause Q, wherein: the indoor environment includes a plurality of visual landmarks; and the sequence of natural language directions defines the path based on a position of the plurality of visual landmarks in relation to the current position of the user device and the destination identified from the user-defined objective.

Example Clause S, the computer-readable storage medium of Example Clause Q or Example Clause R, wherein: the reference database is further configured to store a floor plan depicting a layout of the indoor environment; and the numerical representation of the reference image is stored in association a location within the floor plan.

Example Clause T, the computer-readable storage medium of any one of Example Clause Q through S, wherein: the reference database is configured to store a graph data structure comprising a plurality of nodes corresponding to a first number of floor plans depicting a layout of the indoor environment; and the operations further comprise: identifying a starting node of the plurality of nodes corresponding to the current position of the user device; identifying a destination node of the plurality of nodes corresponding to the destination identified from the user-defined objective; traversing the graph data structure to identify a route connecting the starting node and the destination node; retrieving a second number of floor plans from the first number of floor plans corresponding to the route, wherein the second number of floor plans is less than the first number of floor plans; and generating the sequence of natural language directions based on the second number of floor plans and the plurality of numerical representations of references images associated with the indoor environment.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for navigation assistance in an indoor environment comprising:

receiving a reference image depicting a location within the indoor environment, wherein the reference image includes a natural language annotation describing the location depicted by the reference image;

calculating a numerical representation of the reference image capturing a semantic content of the reference image and the natural language annotation;

storing the numerical representation in a reference database that is configured to store a plurality of numerical representations of reference images and annotations associated with the indoor environment;

receiving an input image from a user device, the input image depicting a current position of the user device within the indoor environment;

in response to receiving the input image from the user device, identifying, by a multimodal language model, the current position of the user device based on a comparison of a numerical representation of the input image against the plurality of numerical representations stored by the reference database;

receiving a natural language input from the user device, wherein the natural language input includes a user-defined objective;

in response to receiving the natural language input from the user device:

identifying, by the multimodal language model, a destination within the indoor environment from the user-defined objective; and outputting, by the multimodal language model, a sequence of natural language directions defining a path from the current position of the user device to the destination identified from the user-defined objective.

2. The method of claim 1, wherein:

the indoor environment includes a plurality of visual landmarks; and the sequence of natural language directions defines the path based on a position of the plurality of visual landmarks in relation to the current position of the user device and the destination identified from the user-defined objective.

3. The method of claim 1, wherein:

the reference database is further configured to store a floor plan depicting a layout of the indoor environment; and the numerical representation of the reference image is stored in association with a location within the floor plan.

4. The method of claim 3, wherein:

the indoor environment is a building comprising a plurality of floors; and the reference database stores a map image corresponding to each floor of the plurality of floors.

5. The method of claim 1, wherein the reference database is configured to store a graph data structure comprising a plurality of nodes corresponding to a first number of floor plans depicting a layout of the indoor environment, the method further comprising:

identifying a starting node of the plurality of nodes corresponding to the current position of the user device;

identifying a destination node of the plurality of nodes corresponding to the destination identified from the user-defined objective;

traversing the graph data structure to identify a route connecting the starting node and the destination node;

retrieving a second number of floor plans from the first number of floor plans corresponding to the route, wherein the second number of floor plans is less than the first number of floor plans; and generating the sequence of natural language directions based on the second number of floor plans and the plurality of numerical representations of references images associated with the indoor environment.

6. The method of claim 1, wherein the input image is received from the user device via an interactive user experience.

7. The method of claim 6, wherein the interactive user experience is activated in response to scanning a quick-response code image using the user device.

8. The method of claim 6, wherein the interactive user experience is activated in response to identifying, based on positional data received from the user device, that the user device has entered the indoor environment.

9. A system for navigation assistance in an indoor environment comprising:

a processing system; and a computer-readable medium having encoded thereon, computer-readable instructions that, when executed by the processing system, cause the system to perform operations comprising:

receiving a reference image depicting a location within the indoor environment, wherein the reference image includes a natural language annotation describing the location depicted by the reference image;

calculating a numerical representation of the reference image capturing a semantic content of the reference image and the natural language annotation;

storing the numerical representation in a reference database that is configured to store a plurality of numerical representations of reference images and annotations associated with the indoor environment;

receiving an input image from a user device, the input image depicting a current position of the user device within the indoor environment;

in response to receiving the input image from the user device, identifying, by a multimodal language model, the current position of the user device based on a comparison of a numerical representation of the input image against the plurality of numerical representations stored by the reference database;

receiving a natural language input from the user device, wherein the natural language input includes a user-defined objective;

in response to receiving the natural language input from the user device:

identifying, by the multimodal language model, a destination within the indoor environment from the user-defined objective; and outputting, by the multimodal language model, a sequence of natural language directions defining a path from the current position of the user device to the destination identified from the user-defined objective.

10. The system of claim 9, wherein:

the indoor environment includes a plurality of visual landmarks; and the sequence of natural language directions defines the path based on a position of the plurality of visual landmarks in relation to the current position of the user device and the destination identified from the user-defined objective.

11. The system of claim 9, wherein:

the reference database is further configured to store a floor plan depicting a layout of the indoor environment; and the numerical representation of the reference image is stored in association with a location within the floor plan.

12. The system of claim 11, wherein:

the indoor environment is a building comprising a plurality of floors; and the reference database stores a map image corresponding to each floor of the plurality of floors.

13. The system of claim 9, wherein:

the reference database is configured to store a graph data structure comprising a plurality of nodes corresponding to a first number of floor plans depicting a layout of the indoor environment; and the operations further comprise:

identifying a starting node of the plurality of nodes corresponding to the current position of the user device;

identifying a destination node of the plurality of nodes corresponding to the destination identified from the user-defined objective;

traversing the graph data structure to identify a route connecting the starting node and the destination node;

retrieving a second number of floor plans from the first number of floor plans corresponding to the route, wherein the second number of floor plans is less than the first number of floor plans; and generating the sequence of natural language directions based on the second number of floor plans and the plurality of numerical representations of references images associated with the indoor environment.

14. The system of claim 9, wherein the input image is received from the user device via an interactive user experience.

15. The system of claim 14, wherein the interactive user experience is activated in response to scanning a quick-response code image using the user device.

16. The system of claim 14, wherein the interactive user experience is activated in response to identifying, based on positional data received from the user device, that the user device has entered the indoor environment.

17. A computer-readable storage medium for navigation assistance in an indoor environment, the computer-readable storage medium having encoded thereon, computer-readable instructions that, when executed by a system, cause the system to perform operations comprising:

receiving a reference image depicting a location within the indoor environment, wherein the reference image includes a natural language annotation describing the location depicted by the reference image;

calculating a numerical representation of the reference image capturing a semantic content of the reference image and the natural language annotation;

storing the numerical representation in a reference database that is configured to store a plurality of numerical representations of reference images and annotations associated with the indoor environment;

receiving an input image from a user device, the input image depicting a current position of the user device within the indoor environment;

in response to receiving the input image from the user device, identifying, by a multimodal language model, the current position of the user device based on a comparison of a numerical representation of the input image against the plurality of numerical representations stored by the reference database;

receiving a natural language input from the user device, wherein the natural language input includes a user-defined objective;

in response to receiving the natural language input from the user device:

identifying, by the multimodal language model, a destination within the indoor environment from the user-defined objective; and outputting, by the multimodal language model, a sequence of natural language directions defining a path from the current position of the user device to the destination identified from the user-defined objective.

18. The computer-readable storage medium of claim 17, wherein:

the indoor environment includes a plurality of visual landmarks; and the sequence of natural language directions defines the path based on a position of the plurality of visual landmarks in relation to the current position of the user device and the destination identified from the user-defined objective.

19. The computer-readable storage medium of claim 17, wherein:

the reference database is further configured to store a floor plan depicting a layout of the indoor environment; and the numerical representation of the reference image is stored in association with a location within the floor plan.

20. The computer-readable storage medium of claim 17, wherein:

the reference database is configured to store a graph data structure comprising a plurality of nodes corresponding to a first number of floor plans depicting a layout of the indoor environment; and the operations further comprise:

identifying a starting node of the plurality of nodes corresponding to the current position of the user device;

identifying a destination node of the plurality of nodes corresponding to the destination identified from the user-defined objective;

traversing the graph data structure to identify a route connecting the starting node and the destination node;

retrieving a second number of floor plans from the first number of floor plans corresponding to the route, wherein the second number of floor plans is less than the first number of floor plans; and generating the sequence of natural language directions based on the second number of floor plans and the plurality of numerical representations of references images associated with the indoor environment.

* * * * *